United States Patent [19]

Iosef et al.

[11] Patent Number: 4,759,920

[45] Date of Patent: Jul. 26, 1988

[54] PROCESS FOR THE MANUFACTURE OF DISODIUM PHOSPHATE

[75] Inventors: Alexander Iosef; Menachem Bar-On, both of Arad, Israel

[73] Assignee: Negev Phosphates Ltd., Dimona, Israel

[21] Appl. No.: 872,062

[22] Filed: Jun. 6, 1986

[30] Foreign Application Priority Data

Mar. 30, 1986 [IL] Israel ............................ 78325

[51] Int. Cl.$^4$ ...................... C01B 15/16; C01B 25/26
[52] U.S. Cl. ............................ 423/309; 423/166; 423/167; 423/308; 423/555
[58] Field of Search ............ 423/167, 313, 166, 309, 423/555

[56] References Cited

U.S. PATENT DOCUMENTS

| | | | |
|---|---|---|---|
| 1,638,677 | 8/1927 | Blumenberg | 423/167 |
| 1,910,808 | 5/1933 | Moore | 423/167 |
| 1,961,127 | 6/1934 | Coleman | 423/167 |
| 2,902,341 | 9/1959 | Baniel et al. | 423/309 |
| 3,294,486 | 12/1966 | Cremer et al. | 423/309 |
| 3,443,889 | 5/1969 | Clifford | 423/309 |
| 3,562,769 | 2/1971 | Sugahara et al. | 423/167 |
| 3,661,513 | 5/1972 | Barker | 423/309 |
| 3,840,639 | 10/1974 | Drechsel | 423/167 |
| 3,993,733 | 11/1976 | Irani | 423/313 |
| 4,222,990 | 9/1980 | Drechsel | 423/167 |

FOREIGN PATENT DOCUMENTS

| | | | |
|---|---|---|---|
| 1519763 | 2/1967 | France | 423/313 |
| 9539 | 3/1983 | Israel | 423/309 |
| 37356 | 10/1984 | Japan | 423/167 |

*Primary Examiner*—John Doll
*Assistant Examiner*—Wayne A. Langel
*Attorney, Agent, or Firm*—Morgan & Finnegan

[57] ABSTRACT

The present invention relates to a process for the manufacture of disodium phosphate of a high purity without utilizing organic solvents. According to the process, monosodium sulfate is reacted, at a temperature, in the range of 40 to 100 degrees C. with a phosphate constituent selected from phosphate rock, dicalcium phosphate or mixtures thereof, in the presence of phosphoric acid. The common metal impurities, organic matter and fluorides present in the starting phosphate rock are substantially complete eliminated with the solid gypsum or dicalcium phosphate resulted thereto. After separating said solid, the filtrate is treated in two neutralization stages: first by a calcium constituent selected from calcium carbonate, calcium hydroxide or mixtures thereof and separating the formed dicalcium phosphate, followed by a second neutralization with an alkali sodium constituent selected from sodium hydroxide, sodium carbonate and sodium bicarbonate or mixtures thereof at a pH in the range of 8.0 to 9.5. From the resulted filtrate, pure disodium phosphate is obtained by crystallization. The process is characterized by a high recovering of the $P_2O_5$ and $Na_2O$ values, the resulted product being substantially free of chloride ion.

11 Claims, No Drawings

PROCESS FOR THE MANUFACTURE OF DISODIUM PHOSPHATE

BACKGROUND OF THE INVENTION

The present invention relates to an improved process for the manufacture of disodium phosphate. More particularly the invention relates to an improved process for the manufacture of hydrated disodium phosphate of a high purity, which does not involve the use of organic solvents.

Disodium phosphate is an important industrial chemical used in detergent industry and other products. It is normally made by reacting $H_3PO_4$ with alkali metal hydroxide or carbonate. The naturally occurring ring alkali metals, such as sodium or potassium, are most commonly mined and recovered as a salt, such as chloride. Thus in order to create phosphoric acid with an alkali metal hydroxide or carbonate, the alkali metal salt must first be converted to the corresponding hydroxide or carbonate. It is thus readily apparent that a process for preparing disodium phosphate which employs NaCl directly, eliminating expensive intermediate processing, would be a highly desirable and economically attractive process.

In principle, the primary reaction between sodium chloride and phosphoric acid may result in a sodium phosphate salt, such as $NaH_2PO_4$ and hydrochloric acid. The practice of this reaction by heating the two reagents, will result in the expulsion of hydrogen chloride, but at the same time would cause a dehydration of the orthophosphate to form the metaphosphate salt ($NaPO_3$). Furthermore, this system is extremely corrosive at the temperatures necessary to expel the hydrogen chloride. The corrosion problem is quite severe and can not be readily overcome and will also result the incorporation of various impurities in the product.

In order to obviate the corrosion problem, some processes were suggested in the last twenty years, in which organic solvents are utilized for removing the hydrogen chloride and thus temperatures in the range of 40 to 100 degrees centigrade may be utilized. Thus according to U.S. Pat. No. 3,443,889 a method is described for the manufacture of disodium phosphate, from sodium chloride and phosphoric acid in the presence of a water immiscible primary alkyl amine containing from 8 to 22 carbon atoms and a water immiscible liquid organic solvent. The organic phase containing the hydrogen chloride is separated from the reaction mixture, the amine being regenerated by treating the organic liquid with an alkaline reagent and its recovery from the remainder reaction mixture. Although the process seems to be quite interesting from a theoretical point of view, in practice its exploitation is quite doubtfully, in view of the expensive solvents required and losses thereof which are inherent during the extraction and regeneration. It should be borne in mind that large amounts of solvents are required in the process, these solvents having molecular weights in the range of 180 to 315, and even small losses of solvent will increase appreciable the overall costs of the process. According to U.S. Pat. No. 3,661,513 sodium phosphate having the formula $Na_{1.5}H_{1.5}PO_4$ is obtained by reacting sodium chloride with phosphoric acid in the presence of a secondary or tertiary amine containing from 6 to 24 carbon atoms. The steps are quite similar to those of the previous patent and has the same disadvantages.

In order to complete the state of the art in respect to the manufacture of sodium phosphate, it should perhaps be interesting to mention its preparation from sodium chloride and phosphoric acid (as described in Israeli Pat. No. 9539) carried out at ambient temperature. According to this process, a great excess of phosphoric acid is utilized, and the mixture of phosphoric acid and hydrochloric acid is removed by solvent extraction using water immiscible organic solvents. The sodium phosphate salt is crystallized from the aqueous solution resulted after removal of the acids. The process is indeed quite elegant, but its implementation on a commercial scale is questionable particularly in view of the high costs involved concerning the organic solvents and energy required to separate the phosphoric acid from hydrochloric acid.

SUMMARY OF THE INVENTION

It is an object of the present invention to provide a simple process for the manufacture of disodium phosphate. It is another object of the present invention to provide a simple process for the manufacture of disodium phosphate which does not require temperatures above 100 degrees C. and thus avoids completely the danger of metaphosphate production. Thus the invention consists of a process for the manufacture of disodium phosphate which comprises the steps of: (a) reacting monosodium sulfate with a phosphate constituent selected from the group consisting of phosphate rock, dicalcium phosphate or mixtures thereof in the presence of phosphoric acid, and separating the formed calcium sulfate; (b) a two stages neutralization of the filtrate obtained in step (a), first by a calcium constituent selected from calcium carbonate, calcium hydroxide or mixtures thereof and separating the formed dicalcium phosphate, followed by a further neutralization by an alkali sodium constituent selected from sodium hydroxide, sodium carbonate and sodium bicarbonate or mixtures thereof at a pH in the range of 8.0 to 9.5; and (c) crystallizing from the filtrate obtained in step (b) substantially pure hydrated disodium phosphate. The phosphoric acid to be present at the end of step (a) should be in the range of 5%-20% by weight of the total $P_2O_5$ present the system. Above 20% the process is still operable, but any excess above this value is actually a waste of $P_2O_5$. The concentration of the $P_2O_5$ in the above mixture of phosphoric acid and sodium salt is not critical and can be selected in a very broad range. It was found that by using the above steps, the product obtained will not be accompanied by phosphoric acid (double salt monosodium phosphate-phosphroc acid) as encountered in the prior art methods.

One of the characteristics of the system is the absence of monocalcium phosphate. This is a result of an excess of the sulfate ion which is present therein, which excluded the formation of monocalcium phosphate, due to the formation of the insoluble calcium sulfate. The excess of sulfate ion has also a beneficial effect on the generation of well-shaped crystals of gypsum with the consequence of their easy filtration.

The starting reagent for the present invention is monosodium sulfate. As known this salt is easily obtained in the reaction between sodium chloride and sulfuric acid occurs in two distinct steps:

$$NaCl + H_2SO_4 \rightarrow NaHSO_4 + HCl \quad (1)$$

$$NaCl + NaHSO_4 \rightarrow Na_2SO_4 + HCl \quad (2)$$

The first reaction for the formation of monosodium phosphate occurs smoothly and is much more easily performed (being exothermic) than the second one of disodium sulfate formation (which is endothermic). The proper conditions for the preparation of monosodium sulfate are well known from the prior art, its preparation being not considered part of the present invention. As known, the temperatures at which it takes place are low enough to permit the use of corrosion-resistant plastics, thus reducing the capital costs.

The temperatures involved in the process according to the present invention are generally in the range of between 40 to 100 degrees centigrade and preferably in the range of between 60 to 80 degrees centigrade. The above relatively low temperatures range, compared with the temperatures of above 160 degrees centigrade mentioned in the prior art, excludes completely the possibility of co-producing the insoluble sodium metaphosphate. As known, the prior art references are utilizing temperatures above 160 degrees C. in order to complete the expulsion of HCl resulting from the reaction of sodium chloride with phosphoric acid:

$$H_3PO_4 + 2NaCl \rightarrow Na_2HPO_4 + 2HCl \qquad (3)$$

Other advantages from utilizing the lower temperature range in the process according to the present invention are of course connected with the save of energy, as well as to the less corrosive conditions which prevail during the process for the equipment.

According to a preferred embodiment, which enables to obtain a maximum yield of $P_2O_5$ and $Na_2O$ recovery, it is suggested to carry out the first step according to the present invention in two or more stages which also enables a better control of the process. In a first stage the reaction occurs between monosodium sulfate and part of the phosphate rock, or dicalcium phosphate (or mixture thereof) in the presence of phosphoric acid. The phosphoric acid may be added such as, or produced in-situ from an additional amount of phosphate rock or dicalcium phosphate and sulfuric acid. The use of phosphoric acid produced in-situ has of course significant economical advantage and also will impart filtration properties to the gypsum resulted which has to be removed. In the second stage, the reaction products from the first stage are reacted with a new portion of phosphate rock or dicalcium phosphate. In this stage the gypsum formed thereto, possesses also good filtration properties and could therefore easily be separated. Also, together with the separated gypsum an apprecialbe amount of organic matter present in the phosphate rock will be removed.

In order to obtain a maximum conversion of the Na+ value into monosodium phosphate, it is suggested to carry out a desulfatization of the solution resulting from step (a), prior to its neutralization. This can be accomplished by the reaction of said solution with calcium phosphate (as illustrated by the reaction given under equation 10 in the next page). After filtering out the formed calcium sulfate, the solution of phosphoric acid entering to the neutralization step will be substantially depleted from the sulfate ion. This is an important additional advantage in view of the strict requirement of sulfate absence in pentasodium polyphosphate (TSPP) which is one of the main outlets of disodium phosphate.

The chemical reactions involved in the process according to the present invention can be schematically presented by the following equations:

$$6NaHSO_4 + Ca_3(PO_4)_2 + 5H_3PO_4 \rightarrow 3Na_2SO_4 + 7H_3PO_4 + 3CaSO_4.2H_2O \qquad (4)$$

$$3Na_2SO_4 + Ca_3(PO_4)_2 + 7H_3PO_4 + 6H_2O \rightarrow 6NaH_2PO_4 + 3CaSO_4.2H_2O + 3H_3PO_4 \qquad (5)$$

$$6NaH_2PO_4 + 3H_3PO_4 + 3CaO \rightarrow 6NaH_2PO_4 + 3CaHPO_4 + 2H_2O \qquad (6)$$

$$3CaHPO_4 + 3NaHSO_4 + 6H_2O \rightarrow 3NaH_2PO_4 + 3CaSO_4.2H_2O \qquad (7)$$

$$Na_2SO_4 + H_3PO_4 + CaHPO_4 \rightarrow 2NaH_2PO_4 + CaSO_4 \qquad (8)$$

$$NaH_2PO_4 + NaOH \rightarrow Na_2HPO_4 + H_2O \qquad (9)$$

$$Na_2SO_4 + 2CaHPO_4 + H_2SO_4 \rightarrow 2NaH_2PO_4 + 2CaSO_4.2H_2O \qquad (10)$$

The second step of the process involves the neutralization of the filtrate obtained in step (a), said filtrate consisting of phosphoric acid and monosodium phosphate. This neutralization is carried out either with calcium oxide (calcium hydroxide), calcium carbonate or other substances containing these compounds or any mixture thereof, depending on the availability of such reagents. Of course that the purity of the disodium phosphate produced in the process, will be influenced to some extent from the purity of the calcium constituent utilized in the neutralization stages. This step involves a second neutralization operation, which is carried out after the removal of the dicalcium phosphate. The resulted filtrate will have a slightly acidic pH (in the range of 4 to 6.5), which will be neutralized by an alkali solution consisting of sodium hydroxide, sodium carbonate or mixtures thereof, (according to equation (9)) reaching a pH in the range of 8.0 to 9.5 and most preferably about 8.6. This neutralization can be carried out either by solid reagent(s) or concentrated solution(s), preferably having a concentration in the range of 30 to 60% by weight. In this neutralization step, any traces of calcium and magnesium ions will precipitate out, leaving a very pure solution of disodium phosphate which can be crystallized out in the form of $Na_2HPO_4.12H_2O$. This crystallization is enhanced by the fact that the solubility of the salt is strongly dependent of temperature; thus, the solution being saturated at 30 degrees C., by cooling to about 5 degrees C., will separate crystals of the hydrated disodium phosphate at the desired size which can be easily separated. The strong temperature dependency, imparts a high yield to the crystals recovery, reaching a value of above 90%. Furthermore, the presence of small amounts of NaCl in the solution will further decrease the solubility of the disodium phosphate, so that the crystallization yield will be even higher than 95%. This is a known effect encountered in the art under the term of salting out.

According to another embodiment of the present invention, part of the dicalcium phosphate resulted after the neutralization (according to equation 6 mentioned above) can be utilized in the step of desulfatization of the solution obtained in step (a), the chemical equations (8) or (10) being involved in this case.

If desired, most of the above dicalcium phosphate could be recycled and utilized in the scheme of the process, provided that a corresponding amount of monosodium sulfate will also be incorporated. This variation might be important when there is no outlet for the resulted co-produced dicalcium phosphate.

The disodium phosphate obtained in the process according to the present invention is characterized by its high purity since most of the impurities precipitate out and are removed with the gypsum produced in step (a). A typical analysis of the disodium phosphate crystals obtained in the process is as follows: $P_2O_5$: 19.7%; $Na_2O$: 17.5%; $SO_4^{--}$: 0.3%; CaO: 24 ppm; $F^-$: 2 ppm; $Cl^-$: 6 ppm; MgO: 35 ppm. The relative high purity of the disodium phosphate obtained according to the present invention, enables its utilization in various products, where a high degree of purity is required. Thus for instance, the disodium phosphate can be easily transformed into sodium tripolyphosphate according to the following reaction:

$$5Na_2HPO_4 + H_3PO_4 = 4Na_2HPO_4 + 2NaH_2PO_4. \quad (11)$$

The solution obtained consists of a mixture of disodium phosphate and monosodium phosphate which is transformed into the tripolyphosphate by the known methods.

Another use for the disodium phosphate obtained, is in the manufacture of very pure phosphate salts, required for food technology or special purposes.

Summing up, the process according to the present invention is characterized by the following advantages:
(1) Substantially pure disodium phosphate is obtained directly, without being accompanied by phosphoric acid, which is generally present when starting with phosphoric acid and sodium chloride.
(2) High conversion and recovery of the sodium and phosphorus values into the desired disodium phosphate are achieved. More than 90% of the input $P_2O_5$ are transformed into sodium phosphate.
(3) Relatively low temperatures, which do not surpass 100 degrees C. are involved, fact which saves appreciable amounts of energy and reduces considerably the corrosion problems of the equipment.
(4) The calcium sulfate co-produced in the process, can be easily removed due to the improved filtration properties. Furthermore, some of the organic matter (generally present in the phosphate rock) is also removed together with the calcium sulfate. As known, serious problems are generally encountered in the filtration of the gypsum resulted in the manufacture of phosphoric acid.
(5) Together with the dicalcium phosphate which is separated from the system, most of the metal impurities as well as fluorides are removed. In this manner, the resulted product will be obtained directly in a very pure state without involving any additional purification step.
(6) When there is no outlet for the dicalcium phosphate co-produced, most of it could be recycled into the process.

While the invention will now be described in connection with certain preferred embodiments in the following Examples, it will be understood that it is not intended to limit the invention to these particular embodiments. On the contrary, it is intended to cover all alternatives, modifications and equivalents as may be included within the scope of the invention as defined by the appended claims. Thus the following Examples which include preferred embodiments will serve to illustrate the practice of this invention, it being understood that the particulars described are by way of example and for purposes of illustrative discussion of preferred embodiments of the present invention, without being limited thereto.

In the Examples presented hereafter, the concentrations are expressed in weight percent, unless otherwise stated.

EXAMPLE 1

In a 3 l glass reactor, provided with a stirrer and controlled heating (70 degrees C.) the following reagents were introduced during about 45 minutes:
280.2 g of monosodium sulfate.
167 g of sulfuric acid (96%).
348 g of phosphate rock (31.5% $P_2O_5$ and 52% CaO).
1405 g of tap water.
The resulting slurry had the following composition (in the clarified solution):
$P_2O_5$: 9.1%
$Na_2O$: 5.1%
CaO: 0.1% and
$SO_4^{--}$: 6.53%.
To the above slurry it was added: 108 g of dicalcium phosphate; 45.8 g of rock phosphate (31.5% $P_2O_5$ and 52% CaO) and 279.7 g of tap water. After agitating the mixture for about 30 minutes at about 70 degrees C., the separated solution from the slurry had the following analysis:
PHD $2O_5$: 10.5%;
$Na_2O$: 4.3%;
CaO: 0.24%; and
$SO_4^{--}$: 2.39%.
To the above slurry, an amount of 79.2 g of dicalcium phosphate 37% $P_2O_5$ was added. After filtration of the above slurry an amount of 729.1 g of gypsum (on dry basis) and 1823 g of filtrate was obtained. The gypsum contained only 2.3% of $P_2O_5$ and 0.29% $Na_2O$ while the analysis of the filtrate was as follows: 10.3% $P_2O_5$; 0.6% CaO and 0.99% $SO_4^{--}$.
To the above filtrate, a slurry of 189 g of calcium hydroxide (32%) was added at a temperature of about 55 degrees C. An amount of 250 g of dicalcium phosphate was separated (53% humidity) leaving 1941 ml of filtrate at a pH 4.8 with a $P_2O_5$ concentration of 6.18%. This filtrate was substantially pure monosodium phosphate and by its neutralization with a solution of 45% NaOH to a pH of 8.7, disodium phosphate was produced. In this neutralization operation, an appreciable amount of heat evolved accompanied by the sedimentation of small particles of CaO and MgO in the form of hydroxyphosphate salts. After removal of the fine precipitate, the filtrate was cooled to about 10 degrees, by a controlled cooling at the rate of about 10 degrees C. per hour. Crystallizing the disodium phosphate. An amount of 870 g of very pure crystals (15% humidity) of disodium phosphate were separated out.

EXAMPLE 2

In a 3 l glass reaction, provided with a stirrer and controlled heating (70 degrees C.), the following reagents were introduced during about 45 minutes:
360.8 g $NaHSO_4$;
147 g $H_2SO_4$ (96%);
348 g of phosphate rock (31.3% $P_2O_5$, 52% CaO);
888 g of tap water; and
348 g of wash water obtained from the filtration of gypsum in Example 1.

The analysis of the clarified solution in the above slurry was: 8.9% $P_2O_5$ and 7.9% $SO_4$.

To the above slurry, an amount of 107.4 phosphate rock of the above composition was added together with 75.9 g dicalcium phosphate (37% $P_2O_5$). After agitating the mixture for about 30 minutes, at about 70 degrees C., the separated solution from the slurry had the following analysis:
$P_2O_5$: 9.07%
$SO_4^{--}$: 3.63%
CaO: 0.22%.

To the above slurry, an amount of 82 g of dicalcium phosphate (37% $P_2O_5$) was added and the mixture was agitated for one hour.

After filtration of the above slurry, an amount of 1050 g of gypsum (22% humidity) and 1741 g of filtrate were separated. The gypsum contained 4.08% $P_2O_5$ and 0.4% $Na_2O$, while the analysis of the filtrate was: 10.15% $P_2O_5$, 0.38% CaO and 1.85% $SO_4^{--}$.

To the above filtrate, a slurry containing 179 g of calcium hydroxide (32%) was added at a temperature of about 55 degrees C. An amount of 241 g of dicalcium phosphate was separated (49% humidity) leaving a solution of 1960 ml. The solution had a pH of 4.75 with a $P_2O_5$ concentration of 7.6%. This filtrate consisted substantially of pure monosodium phosphate; by its neutralization with a solution of 47.5% NaOH (containing 1.2% NaCl) to a pH of about 8.7, disodium phosphate was produced. In this neutralization operation, an appreciable amount of heat evolved, being accompanied by the precipitation of small particles of CaO and MgO in the form of hydroxyphosphate salts. After the removal of the fine precipitates, the filtrate was cooled to about 5 degrees, by a controlled cooling at the rate of about 10 degrees per hour. The chloride concentration in the mother-liquor was about 2% which gave rise to an increase of crystallization, the yield depending on NaCl concentration, known as salting out effect. An amount of 920 g of very pure crystals (14% humidity) of disodium phosphate were separated.

EXAMPLE 3

In a 3 l glass reactor, provided with a stirrer and controlled heating (70 degrees C.), the following reagents were introduced during about 45 minutes:
360.8 g $NaHSO_4$;
147 g $H_2SO_4$ (96%);
348 g phosphate rock (32.1% $P_2O_5$, 51.4% CaO);
564 g tap water;
350 g of wash water obtained from the filtration of gypsum in Example 2.

The resulting slurry contained in the clarified solution, 11.4% $P_2O_5$ and 9.6% $SO_4^{--}$. To the above slurry it was added an amount of 104 g phosphate rock (fine grounded) of the above composition, together with 69.5 g dicalcium phosphate (separated from Example 2). After agitating the mixture for about 30 minutes at about 70 degrees C., the clarified solution had the following analysis:
$P_2O_5$ 12.0%
$SO_4^{--}$ 2.8%
CaO 0.31%

To the above slurry an amount of 82.5 g of dicalcium phosphate (obtained in Example 2) was added, the slurry was further agitated for one hour. After filtration of the above slurry, an amount of 1337 g of washed gypsum (39.2% humidity) and 1050 g of filtrate were obtained. The gypsum contained 2.1% $P_2O_5$ and 1.25% $Na_2O$, while the analysis of the filtrate was 12.1% $P_2O_5$, 0.67% Cao and 1.16% $SO_4^{--}$.

To the above filtrate, a slurry of 185 g of calcium hydroxide was added at a temperature of about 45 degrees C. An amount of 274 g of dicalcium phosphate was separated (46% humidity) leaving 1690 ml of filtrate at a pH of 4.8 with a $P_2O_5$ concentration of 9.5%. The filtrate was substantially pure monosodium phosphate, which by neutralization with a solution of 46% NaOH (containing 1.8% NaCl) to a pH of 8.7 substantially disodium phosphate was produced. In this neutralization an appreciable amount of heat evolved. After the removal of a fine precipitate containing CaO and MgO, the filtrate was cooled to about 3 degrees by a controlled cooling at a rate of about 15 degrees per hour. The chloride concentration in the mother liquor was about 2.5% which produced a considerable increase in crystals yield (salting out effect). An amount of 1104 g of wet crystals (16% humidity) of pure disodium phosphate was separated.

I claim:
1. A process for the manufacture of substantially pure disodium phosphate without utilizing organic solvents which comprises the steps of:
   (a) reacting in at least two stages, at a temperature between 40° C. and 100° C. monosodium sulfate with a phosphate constituent selected from the group consisting of phosphate rock, dicalcium phosphate and mixtures thereof in the presence of phosphoric acid to form a slurry containing phosphoric acid, monosodium phosphate and calcium sulfate and separating out the formed calcium sulfate to obtain a filtrate containing phosphoric acid and monosodium phosphate, the amount of phosphoric acid being in the range of between 5% and 20% of the total $P_2O_5$, the slurry being characterized by the absence of monocalcium phosphate;
   (b) neutralizing in two stages the filtrate obtained in step (a) first with a calcium constituent selected from calcium carbonate, calcium hydroxide and mixtures thereof, at a pH in the range of between 4 and 6.5 to obtain a slurry containing dicalcium phosphate and separating out the formed dicalcium phosphate, followed by further neutralizing with an alkali sodium constituent selected from sodium hydroxide, sodium carbonate and sodium bicarbonate or mixtures thereof at a pH in the range of 8.0 to 9.5; and
   (c) crystallizing out from the filtrate formed in step (b) substantially pure hydrated disodium phosphate.

2. A process accroding to claim 1, wherein the phosphoric acid in step (a) is produced in situ from an additional amount of phosphate rock and sulfuric acid.

3. A process according to claim 1, wherein the solution obtained in step (a) is desulfatized prior to the neutralization operation in step (b).

4. A process according to claim 3, wherein said desulfatization is carried out with dicalcium phosphate produced in step (b) and separating out the formed calcium sulfate.

5. A process according to claim 1, wherein metal impurities and fluorides present in the phosphate constituent are eliminated with the gypsum separated in step (a) or dicalcium phosphate separated in step (b).

6. A process according to claim 1, wherein some of the organic matter present in the phosphate rock is eliminated with the calcium sulfate.

7. A process according to claim 1, wherein the pH at the end of the second neutralization stage is about 8.6.

8. A process according to claim 7, wherein said neutralization is carried out by an alkaline solution selected from the group consisting of sodium hydroxide, sodium carbonate and sodium bicarbonate or mixtures thereof.

9. A process according to claim 7, wherein said alkaline solution has a concentration in the range of between 30% to 60% by wt.

10. A process according to claim 1, wherein the separation of the crystals of hydrated disodium phosphate is carried out by cold crystallization.

11. A process according to claim 10, wherein sodium chloride is present in the solution entering the crystallization step.

* * * * *